United States Patent [19]
Hubbard et al.

[11] Patent Number: 5,565,862
[45] Date of Patent: Oct. 15, 1996

[54] COLLECTION AND MANAGEMENT OF PIPELINE-FLOW DATA

[75] Inventors: Eugene N. Hubbard, La Jolla; Jerome R. Beauchane, Del Mar; Edwin T. Lester, San Diego, all of Calif.

[73] Assignee: The Titan Corporation, San Diego, Calif.

[21] Appl. No.: 411,504

[22] Filed: Mar. 28, 1995

[51] Int. Cl.$^6$ ............................ G08C 19/04; G08C 19/10
[52] U.S. Cl. ................................ 340/870.11; 340/870.02
[58] Field of Search ........................ 340/870.02, 870.03, 340/870.05, 870.11; 137/554

[56] References Cited

U.S. PATENT DOCUMENTS

| | | | |
|---|---|---|---|
| 3,387,266 | 6/1968 | Swartwout et al. | 340/150 |
| 3,723,987 | 3/1973 | Barone, Jr. et al. | 340/242 |
| 4,090,179 | 5/1978 | Hirano | 340/242 |
| 4,160,239 | 7/1979 | Adamson | 340/505 |
| 4,203,090 | 5/1980 | Adamson | 340/618 |
| 4,342,986 | 8/1982 | Buskirk et al. | 340/505 |
| 4,415,896 | 11/1983 | Allgood | 340/870.03 |
| 4,481,503 | 11/1984 | Lehman et al. | 340/518 |
| 4,568,934 | 2/1986 | Allgood | 340/870.05 |
| 4,736,193 | 4/1988 | Solcum et al. | 340/620 |
| 4,799,059 | 1/1989 | Grindahl et al. | 340/870.03 |
| 4,833,618 | 5/1989 | Verma et al. | 340/870.02 |
| 4,845,486 | 7/1989 | Knight et al. | 340/618 |
| 4,940,976 | 7/1990 | Gastouniotis et al. | 340/870.02 |
| 5,239,575 | 8/1993 | White et al. | 340/870.02 |
| 5,270,704 | 12/1993 | Sosa Quintana et al. | 340/870.02 |
| 5,432,507 | 7/1995 | Mussino et al. | 340/870.03 |

OTHER PUBLICATIONS

"Barton ADScan Electronic/Datalogger Retrofit Kit," ITT Barton, 1992.
"Barton RT–10 Recorder Transmitter" ITT Barton, 1991.
"Barton Models 202E & 208E Differential Pressure Recorders Installation and Operation Manual", ITT Barton, 1990 pp. 1–1, 1–3, 1–5.

*Primary Examiner*—Jeffery Hofsass
*Assistant Examiner*—Timothy Edwards, Jr.
*Attorney, Agent, or Firm*—Edward W. Callan

[57] ABSTRACT

Pipeline-flow data is collected at a pipeline location and from time to time transferred to another location. A pair of controllers at the pipeline location autonomously cause the collected pipeline-flow data to be automatically transferred by a transceiver at predetermined times from the pipeline location to the other location and thereby enable the system to be powered by batteries on a low power budget. A first controller is adapted for providing an activation signal for turning on the second controller, and the second controller is adapted for turning off the second controller at predetermined times, for turning on and off the transceiver at predetermined times, and for instructing the first controller when next to provide the activation signal.

17 Claims, 1 Drawing Sheet

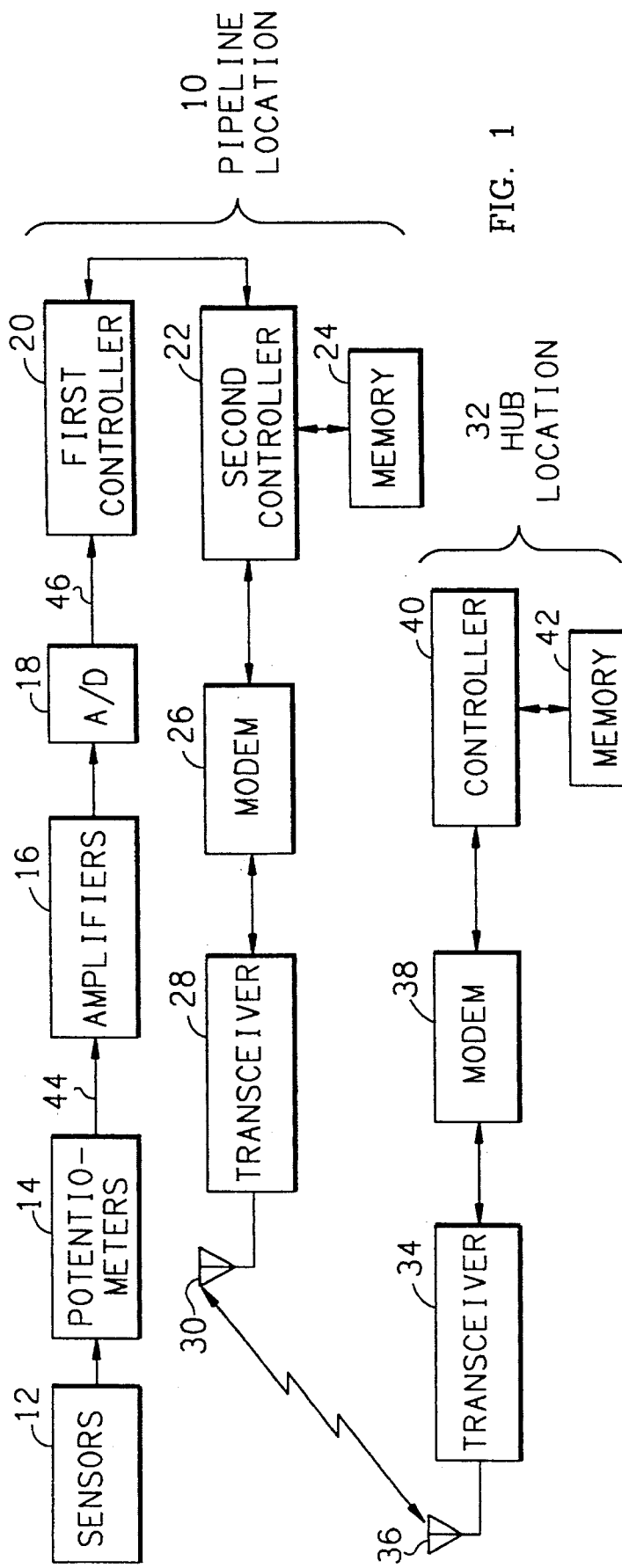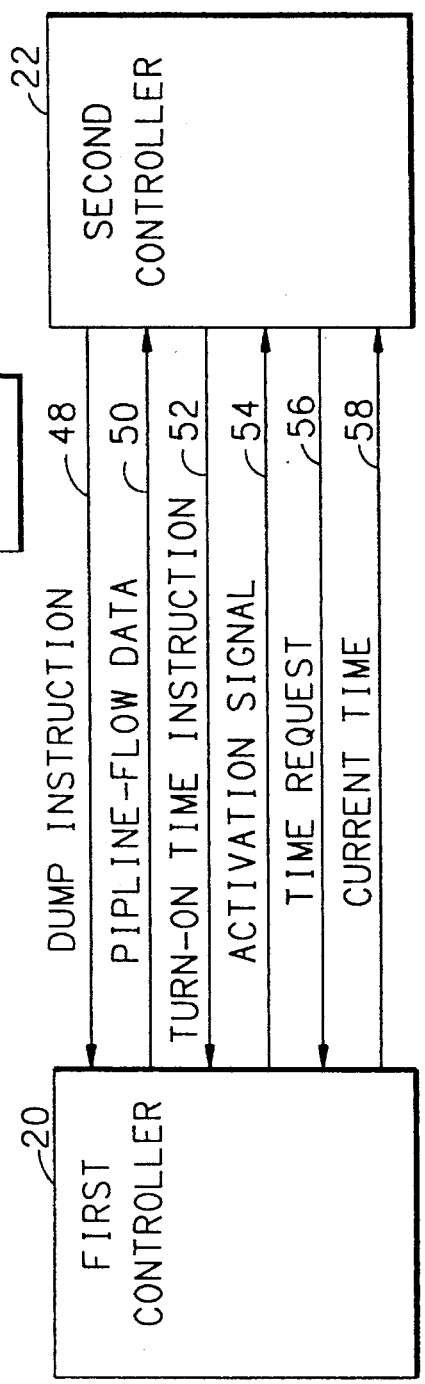

COLLECTION AND MANAGEMENT OF PIPELINE-FLOW DATA

BACKGROUND OF THE INVENTION

The present invention generally pertains to collection and management of pipeline-flow data and is particularly directed to an improvement in transferring the collected pipeline-flow data.

Pipeline-flow data is collected and processed to determine the quantity of a fluid that has been transported through a pipeline during a given time period. When the fluid is natural gas, the pipeline-flow data typically includes static pressure, differential pressure and temperature. Pipeline-flow data has been collected for several years by use of a Barton Model 202 Series flow recorder disposed at a pipeline location. This flow recorder includes pens for recording sensed data on a chart recording medium that is rotated beneath pins that are mounted on pivotal shafts that are coupled by mechanical linkage to transducers that are coupled to the pipeline and move in response to changes in static pressure, differential pressure and temperature, respectively, and thereby sense these parameters. Potentiometers are sometimes coupled by mechanical linkage to the pen shafts for translating pen shaft movement into electrical pipeline-flow data signals. Such coupling is provided in both a Barton RT-10 recorder transmitter and in a Barton ADScan electronic datalogger retrofit kit. These Barton products are available from ITT Barton Instruments Company, City of Industry, Calif.

It is known to transfer pipeline-flow data from a plurality of pipeline locations to a hub location and to further transfer the pipeline-flow data from a plurality of hub locations to a central location for final processing. Billing of customers is based upon such final processing. The transfer of the pipeline-flow data typically is by radio or telephone transmission, with such transmission typically being in response to a polling signal received from a location other than the location from which the transmission emanates.

SUMMARY OF THE INVENTION

The present invention provides a system for collecting and managing pipeline-flow data, comprising means at a pipeline location for collecting pipeline-flow data; means at the pipeline location for from time to time transferring the collected pipeline-flow data to another location; and means at the pipeline location for causing the collected pipeline-flow data to be automatically transferred at predetermined times by the transferring means from the pipeline location to the other location.

The means for causing said collected data to be automatically transferred at predetermined times includes timing means at the pipeline location for defining said predetermined times, wherein the timing means includes a first controller and a second controller coupled to the first controller and the transferring means; wherein the first controller is adapted for providing an activation signal for turning on the second controller; and wherein the second controller is adapted for turning off the second controller at predetermined times, for turning on and off the transferring means at predetermined times, and for instructing the first controller when next to provide a said activation signal. Accordingly, the means at the pipeline location may be powered by batteries on a low power budget. A memory at the pipeline location accumulates the collected pipeline-flow data for said transfer to the other location; and the second controller is further adapted for instructing the first controller at predetermined times to send the collected pipeline-flow data to the accumulating means. A low power budget is achieved by turning off the second controller and the transferring means for long intervals during which they are not being used for either accumulating collected pipeline-flow data or transferring the accumulated data.

The present invention also provides a method of collecting and managing pipeline-flow data, comprising the steps of: (a) collecting pipeline-flow data at the pipeline location; (b) from time to time transferring the collected pipeline-flow data from the pipeline locations to a hub location; (c) at the pipeline location, causing the collected pipeline-flow data to be automatically transferred only autonomously at predetermined times from the pipeline location to the hub location; (d) at a hub location, receiving and storing the pipeline-flow data transferred from the pipeline-location; and (e) at the hub location, transferring the stored pipeline-flow data to a central location solely in response to a polling signal.

Additional features of the present invention are described with reference to the detailed description of the preferred embodiments.

BRIEF DESCRIPTION OF THE DRAWING

FIG. 1 is a block diagram of the pipeline-flow data collection and management system of the present invention.

FIG. 2 illustrates the communication of data and control signals between the first and second controllers included in the portion of the system of the FIG. 1 that is at the pipeline location.

DETAILED DESCRIPTION

Referring to FIG. 1, a preferred embodiment of the system of the present invention includes at a pipeline location 10: a set of sensors 12, a set of potentiometers 14, a set of amplifiers 16, an analog to digital (A/D) converter 18, a first controller 20, a second controller 22, a memory 24, a modem 26 and a transceiver 28, which is coupled to an antenna 30. All of the components at the pipeline location are battery powered. At a hub location 32, the preferred embodiment of the system may further include a transceiver 34 coupled to an antenna 36, a modem 38, a controller 40 and a memory 42.

The sensors 12 are three transducers embodied in a Barton Model 202E flow recorder for sensing static pressure, differential pressure and temperature. Three potentiometers 14 are coupled by mechanical linkage to the pen shafts of the Barton flow recorder for translating pen shaft movement into three separate analog electrical pipeline-flow data signals 44 respectively representative of static pressure, differential pressure and temperature.

The pipeline-flow data signals 44 are amplified by three amplifiers 16, such as operational amplifiers, and converted to digital signals 46 by the A/D converter 18. The input of the A/D converter 18 multiplexes the signals received from the amplifiers 16, whereby the digital data signals 46 are provided by the A/D converter 18 to the first controller 20 in a multiplexed format.

The first controller 20 is embodied in a Model PIC 16C57 microcontroller available from Microchip Technology Incorporated, Chandler, Ariz. The first controller 20 collects the pipeline-flow data by sampling the digital pipeline-flow data signals 46 at a rate of approximately once per second. The first controller 20 also processes the digital pipeline-flow data signals 46 at the same rate as such signals 46 are sampled to calculate flow extension. The first controller 20 further separately adds each static pressure, differential pressure and temperature data sample and each flow extension calculation to respective sums of previous samples and calculations of such parameters, and continues to do so until such time as the first controller 20 responds to a "dump" instruction 48 from the second controller 22 by sending such sums of pipeline-flow data 50 to the second controller 22. The first controller 20 begins a new adding sequence starting from zero with the next samples and calculation following the sending of such sums of pipeline-flow data 50 to the second controller 22.

The second controller 22 is embodied in a Model 68HC11 microcontroller available from Motorola and an EEPROM in which programming instructions defining the operation of the microcontroller and the timing thereof are stored. The second controller 22 periodically instructs the first controller 20 to send such sums of pipeline-flow data 50 to the second controller 22 at a rate of approximately once per hour.

The second microcontroller 22 causes the sums of pipeline-flow data 50 sent by the first controller 20 to be stored in the memory 24, which is embodied in a circular buffer and has a capacity adequate for storing several days of accumulated pipeline-flow data 50. When the circular buffer is full, newly stored data replaces the most ancient stored data. The memory 24 is a non-volatile memory.

At a predetermined time each day, the second controller 22 retrieves from the memory 24 all of the accumulated pipeline-flow data that has not been transferred previously to the hub location 32 and causes such retrieved accumulated data to be sent via the modem 26 to the transceiver 28 and transferred by the transceiver 28 to the hub location 32. The transceiver 28 is embodied in a "Data Cell" Model No. TKB91 cellular telephone available from Ericsson GE Mobile Communications, Inc., Research Triangle Park, N.C.

At the hub location, the transceiver 34 receives the pipeline-flow data transferred from the pipeline location and transfers such received data via the modem 38 to the controller 40. The transceiver 34 is a telephone company transceiver for communicating with cellular telephones, and the communication link between the transceiver 28 at the pipeline location 10 and the transceiver 34 at the hub location 32 is effected in accordance with standard telephone company protocol for cellular telephone communications.

After the transceiver 34 receives the data transferred from the pipeline location 10, the transceiver 34 sends a data-received message to the second controller 22 via the transceiver 28 and the modem 28. Upon receiving the data-received message from the transceiver 34, the second controller determines that transmission of the accumulated pipeline-flow data to the hub location 32 was successfully completed. If the second controller 22 does not receive a data-received message from the transceiver 34 within a predetermined interval after transmitting the accumulated pipeline-flow data, the second controller 22 causes the transceiver 28 to try again at other predetermined times during the same day to effect a communication link with the transceiver 34 at the hub location and causes the accumulated pipeline-flow data to be transmitted by the transceiver 28 upon the communication link being effected.

By causing each transmission of the accumulated pipeline-flow data to be of all of the accumulated pipeline-flow data not previously transferred, the system of the present invention assures that all of the accumulated pipeline-flow data is eventually transferred from the pipeline location 10 to the hub location 32 even though there may some days on which such transfer is not successfully completed. When it is noticed at the central location that pipeline-flow data for a given pipeline location has not been received for a given number of consecutive days, an inspector can visit the given pipeline location to determine whether there may be an equipment malfunction at the pipeline location.

The pipeline-flow data received by the controller 40 is stored in the memory 42. Pipeline-flow data received from a plurally of different pipeline locations is stored in the memory 42 and is retrieved each day by the controller 40 for transmission to a central location in response to a polling signal. Such data transmission to the central location is completed via the modem 38 and a telephone company transceiver 34. In an alternative embodiment, in which the transceiver 34 is not a telephone company transceiver, an additional modem and an additional transceiver (not shown) are used for communicating data from the hub location 32 to the central location.

In one preferred embodiment, the transfer of the stored pipeline-flow data to a central location is solely in response to a polling signal received by the controller 40; whereby the controller 40 is passive in the sense that the controller 40 does not determine either when data is transferred to the controller 40 or when data is transferred from the controller 40.

The predetermined times at which the summed pipeline-flow data 50 is to be sent from the first controller 20 to the second controller 22 and at which the accumulated pipeline-flow data is to be transferred by the transceiver 28 from the pipeline location 10 to the hub location 32 are stored in the second controller 22 and are retained in the second controller 22 while the second controller 22 is turned off.

Upon completion of each transfer of summed pipeline-flow data from the first controller 20, the second controller 22 turns itself off.

Upon completion of each transfer of accumulated pipeline-flow data by the transceiver 28 from the pipeline location 10 to the hub location 32, and upon each completion of an unsuccessful effort to so transfer such data, the second controller 22 turns off the second controller 22, the transceiver 28 and the modem 26.

Immediately prior to each time that the second controller 22 turns itself off, the second controller 22 retrieves from an internal memory in the second controller 22 the next time that the second controller 22 is to be turned on for causing a data transfer either from the first controller 20 or by the transceiver 28 and provides to the first controller 20 a signal 52 instructing the first controller 20 to turn on the second controller 22 at such next time.

The first controller 20 is adapted for providing an activation signal 54 to the second controller 22 for turning on the second controller 22 at the time indicated in the signal 52.

The first controller 20 includes a clock that maintains current time; and when the second controller 22 is turned on, the second controller 22 is adapted for accessing the first controller 20 with a time request signal 56 to ascertain the current time. The second controller 22 receives a current time signal 58 from the first controller 20 in response to the time request signal 56.

The second controller 22 is adapted for turning on the transceiver 28 only at such predetermined times as immediately precede a transfer of data by the transceiver 28.

By reason of providing such a combination of a first controller 20 and a second controller 22 at the pipeline location 10 for autonomously causing the collected pipeline-flow data to be automatically transferred at predetermined times by the transceiver 28 from the pipeline location 10 to the hub location 32, the transceiver 28 does not have to be turned on continuously to await a polling signal from some other location and thereby can be turned off to conserve battery power except during the long intervals when the transceiver 28 is being used to transfer the accumulated pipeline-flow data to the hub location 32. Also, the second controller 22 can be turned off to further conserve battery power during the long intervals when the second controller 22 is not being used to cause the transfer of data either from the first controller 20 or by the transceiver 28.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. A system for collecting and managing pipeline-flow data, comprising means at a pipeline location for collecting pipeline-flow data;

means at the pipeline location for from time to time transferring the collected pipeline-flow data to another location; and means at the pipeline location for causing the collected pipeline-flow data to be automatically transferred at predetermined times by the transferring means from the pipeline location to the other location;

wherein the means for causing said collected data to be automatically transferred at predetermined times includes timing means at the pipeline location for defining said predetermined times;

wherein the timing means includes a first controller and a second controller coupled to the first controller and the transferring means;

wherein the first controller is adapted for providing an activation signal for turning on the second controller; and wherein the second controller is adapted for turning off the second controller at predetermined times, for turning on and off the transferring means at predetermined times, and for instructing the first controller when next to provide a said activation signal.

2. A system according to claim 1, further comprising means at the pipeline location for accumulating the collected pipeline-flow data for said transfer to the other location;

wherein the second controller is further adapted for instructing the first controller at predetermined times to send the collected pipeline-flow data to the accumulating means.

3. A system according to claim 2, wherein the second controller is adapted to be turned off during intervals when the second controller is not involved in the sending of data by the first controller or the transfer of data by the transferring means.

4. A system according to claim 2, wherein the second controller is adapted for causing each said transfer to be of all of the accumulated pipeline-flow data not previously transferred.

5. A system according to claim 1, wherein the first controller maintains current time and the second controller is adapted for accessing the first controller to ascertain current time upon the second controller being turned on.

6. A system for collecting and managing pipeline-flow data, comprising means at a pipeline location for collecting pipeline-flow data;

means at the pipeline location for from time to time transferring the collected pipeline-flow data to a hub location;

means at the pipeline location for causing the collected pipeline-flow data to be automatically transferred only autonomously at predetermined times by the transferring means from the pipeline location to the hub location;

means at the hub location for receiving and storing the pipeline-flow data transferred from the pipeline location; and means at the hub location for transferring the stored pipeline-flow data to a central location solely in response to a polling signal.

7. A method of collecting and managing pipeline-flow data, comprising the steps of:

(a) collecting pipeline-flow data at the pipeline location;

(b) from time to time transferring the collected pipeline-flow data from the pipeline location to a hub location;

(c) at the pipeline location, causing the collected pipeline-flow data to be automatically transferred only autonomously at predetermined times from the pipeline location to the hub location;

(d) at the hub location, receiving and storing the pipeline-flow data transferred from the pipeline location; and (e) at the hub location, transferring the stored pipeline-flow data to a central location solely in response to a polling signal.

8. A method according to claim 7, wherein step (c) includes the steps of (f) using a first controller to provide an activation signal for turning on a second controller; and (g) using the second controller to turn on and off means for transferring the data at predetermined times, to turn off the second controller at predetermined times and to instruct the first controller when next to provide a said activation signal.

9. A method according to claim 8, further comprising the steps of:

(h) using the first controller to maintain current time;

(i) using the second controller to access the first controller to ascertain current time upon the second controller being turned on.

10. A method according to claim 8, further comprising the steps of:

(h) at the pipeline location, accumulating the collected pipeline-flow data for said transfer to the other location; and (i) using the second controller to instruct the first controller at predetermined times to send the collected pipeline-flow data to means for accumulating the pipeline-flow data.

11. A method according to claim 10, wherein step (g) includes the step of:

(j) turning off the second controller during intervals when the second controller is not involved in the sending of data by the first controller or the transfer of data by the transferring means.

12. A method according to claim 10, further comprising the step of:

(k) using the second controller to cause each said transfer to be of all of the accumulated pipeline-flow data not previously transferred.

13. A system for collecting and managing data, comprising means at a first location for collecting data;

means at the first location for from time to time transferring the collected data to another location; and means at the first location for causing the collected data to be automatically transferred at predetermined times by the transferring means from the first location to the other location;

wherein the means for causing said collected data to be automatically transferred at predetermined times includes timing means at the first location for defining said predetermined times;

wherein the timing means includes a first controller and a second controller coupled to the first controller and the transferring means;

wherein the first controller is adapted for providing an activation signal for turning on the second controller; and wherein the second controller is adapted for turning off the second controller at predetermined times, for turning on and off the transferring means at predetermined times, and for instructing the first controller when next to provide a said activation signal.

14. A system according to claim 13, further comprising means at the first location for accumulating the collected data for said transfer to the other location;

wherein the second controller is further adapted for instructing the first controller at predetermined times to send the collected data to the accumulating means.

15. A system according to claim 14, wherein the second controller is adapted to be turned off during intervals when the second controller is not involved in the sending of data by the first controller or the transfer of data by the transferring means.

16. A system according to claim 14, wherein the second controller is adapted for causing each said transfer to be of all of the accumulated data not previously transferred.

17. A system according to claim 13, wherein the first controller maintains current time and the second controller is adapted for accessing the first controller to ascertain current time upon the second controller being turned on.

\* \* \* \* \*